United States Patent
Roitman et al.

(12) 
(10) Patent No.: US 6,803,097 B2
(45) Date of Patent: Oct. 12, 2004

(54) COMPOSITE FILM MADE OF PARTICLES EMBEDDED IN A POLYMER MATRIX

(75) Inventors: Daniel B. Roitman, Menlo Park, CA (US); Seiji Inaoka, Campbell, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 41 days.

(21) Appl. No.: 10/327,285

(22) Filed: Dec. 19, 2002

(65) Prior Publication Data

US 2004/0121143 A1 Jun. 24, 2004

(51) Int. Cl.$^7$ ................................................. B32B 5/16
(52) U.S. Cl. ...................... 428/327; 205/109; 205/317; 205/414; 428/323; 428/328; 428/331
(58) Field of Search ................................ 205/109, 317, 205/414; 428/323, 327, 328, 331

(56) References Cited

U.S. PATENT DOCUMENTS 5,997,714 A * 12/1999 Hamahara et al. .......... 205/290

* cited by examiner

Primary Examiner—D. S. Nakarani

(57) ABSTRACT

The present invention is a film and method for making the same. The film includes a plurality of particles having a desired film property that are entrapped in a matrix of linkage polymer molecules. The linkage polymer molecules ionically bind to the particles. The linkage polymer molecules are electrochemically polymerizable in a solvent. The particles are insoluble in the solvent. The film is prepared by providing an electrode and a solution of the linkage polymer molecules in which the particles are suspended. An electrical potential is provided between the solution and the electrode in temporal sequence that causes the linkage polymer molecules to polymerize in the vicinity of the electrode thereby entrapping the particles.

18 Claims, 2 Drawing Sheets

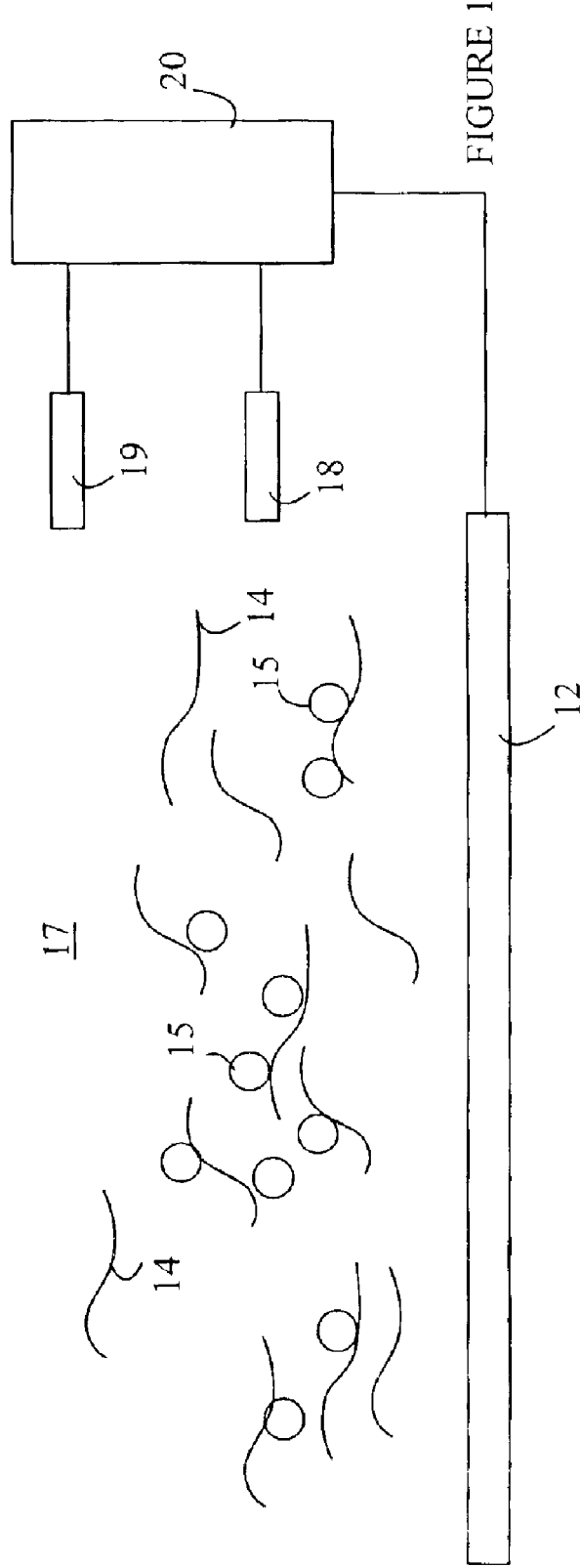
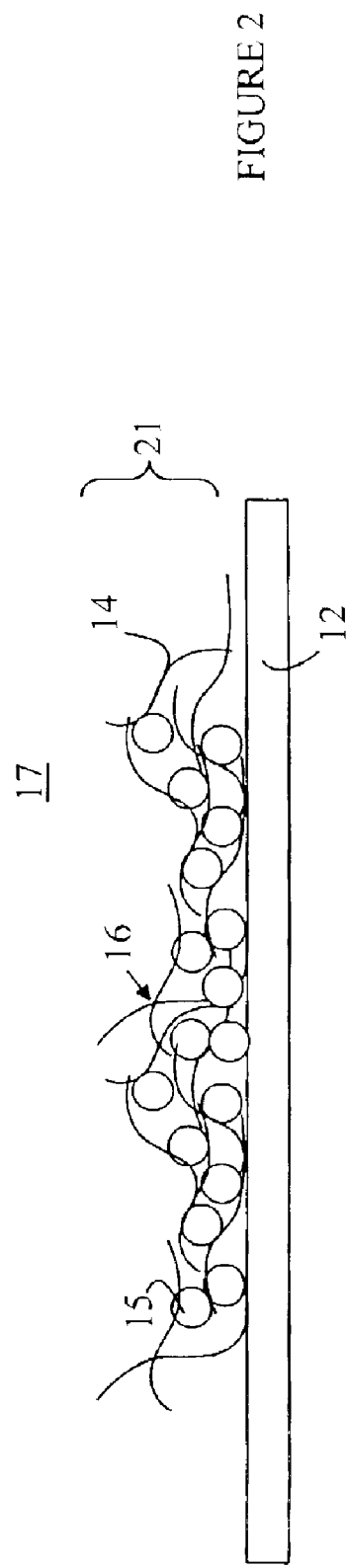
FIGURE 1
FIGURE 2

COMPOSITE FILM MADE OF PARTICLES EMBEDDED IN A POLYMER MATRIX

FIELD OF THE INVENTION

The present invention relates to electro-polymerization of films, and more particularly, to methods for selectively depositing films.

BACKGROUND OF THE INVENTION

The present invention can be more easily understood with reference to an application in which a thick optical film is to be deposited in a predetermined pattern on a surface. Consider a pixelated organic light emitting diode (OLED) display in which the color of light generated by each pixel is determined by a color conversion layer that is deposited between the light emitting portion of the OLED and the viewer. Typically, red, green and blue emitting pixels are deposited adjacent to one another to provide a full color display. The color conversion layer may be constructed from a fluorescent material that converts the light emitted by the OLED to one of the primary colors. Alternatively, in the case of a white light emitting OLED, the color conversion layer may be constructed from a color filter. In either case, a relatively thick layer of material must be deposited at specific locations on the display while leaving the remaining pixels uncovered.

In conventional semiconductor fabrication, this problem is typically solved by masking the pixels that are not to receive the color conversion layer and then depositing the color conversion material in the unmasked areas. The masks are then removed and the process repeated with the next color conversion material until all of the desired color materials have been deposited. For a full color OLED display, this process requires three different masking, deposition, and mask removal steps. In addition, this process is limited to color conversion materials that can withstand the masking and mask removal steps, as the layers that have been deposited in a previous deposition step must be masked and unmasked in subsequent deposition steps.

Electrolytic deposition of organic polymers is known to the art. This type of deposition requires only that the area to be covered be connected to an electrode that can be selectively powered during the deposition step. In many applications, the areas to be covered already include electrodes that can be separately addressed. However, even if separate electrodes must be provided, the process of depositing a transparent electrode is less complex than the masking, deposition, and cleaning steps discussed above. Further, the materials already deposited in an earlier deposition step do not need to be masked when other areas are coated in a subsequent deposition step; hence more fragile materials can be utilized.

For example, U.S. Pat. No. 6,294,245 teaches the deposition of organic polymers that can be constructed from monomers having four coupling sites on each monomer. The process requires the synthesis of precursor polymers that consist of the monomers joined together by two of the sites. The film is then deposited by linking the precursor polymers electrochemically using the remaining sites. The linked precursor polymers must be insoluble in the solvent used in the deposition; whereas, the precursor polymers must be soluble in this solvent. Unfortunately, the range of materials that can be deposited in this manner is limited. Hence, a monomer with the desired optical properties when deposited in the film is not always available at a commercially attractive price. In addition, the thickness of the films generated per unit time is also limiting.

Broadly, it is the object of the present invention to provide an improved method for depositing films via electrochemical polymerization and an improved class of films.

This and other objects of the present invention will become apparent to those skilled in the art from the following detailed description of the invention and the accompanying drawings.

SUMMARY OF THE INVENTION

The present invention is a film and method for making the same. The film includes a plurality of particles having a desired film property that are entrapped in a matrix of linkage polymer molecules. The linkage polymer molecules non-covalently bind to the particles. The linkage polymer molecules are electrochemically polymerizable in a solvent. The particles are insoluble in the solvent. The film is prepared by providing an electrode and a solution of the linkage polymer molecules in which the particles are suspended. An electrical potential is provided between the solution and the electrode in temporal sequence that causes the linkage polymer molecules to polymerize in the vicinity of the electrode thereby entrapping the particles.

BRIEF DESCRIPTION OF THE DRAWINGS

FIGS. 1 and 2 illustrate the deposition of a thick film by the method of the present invention.

DETAILED DESCRIPTION OF THE INVENTION

Figure 3:
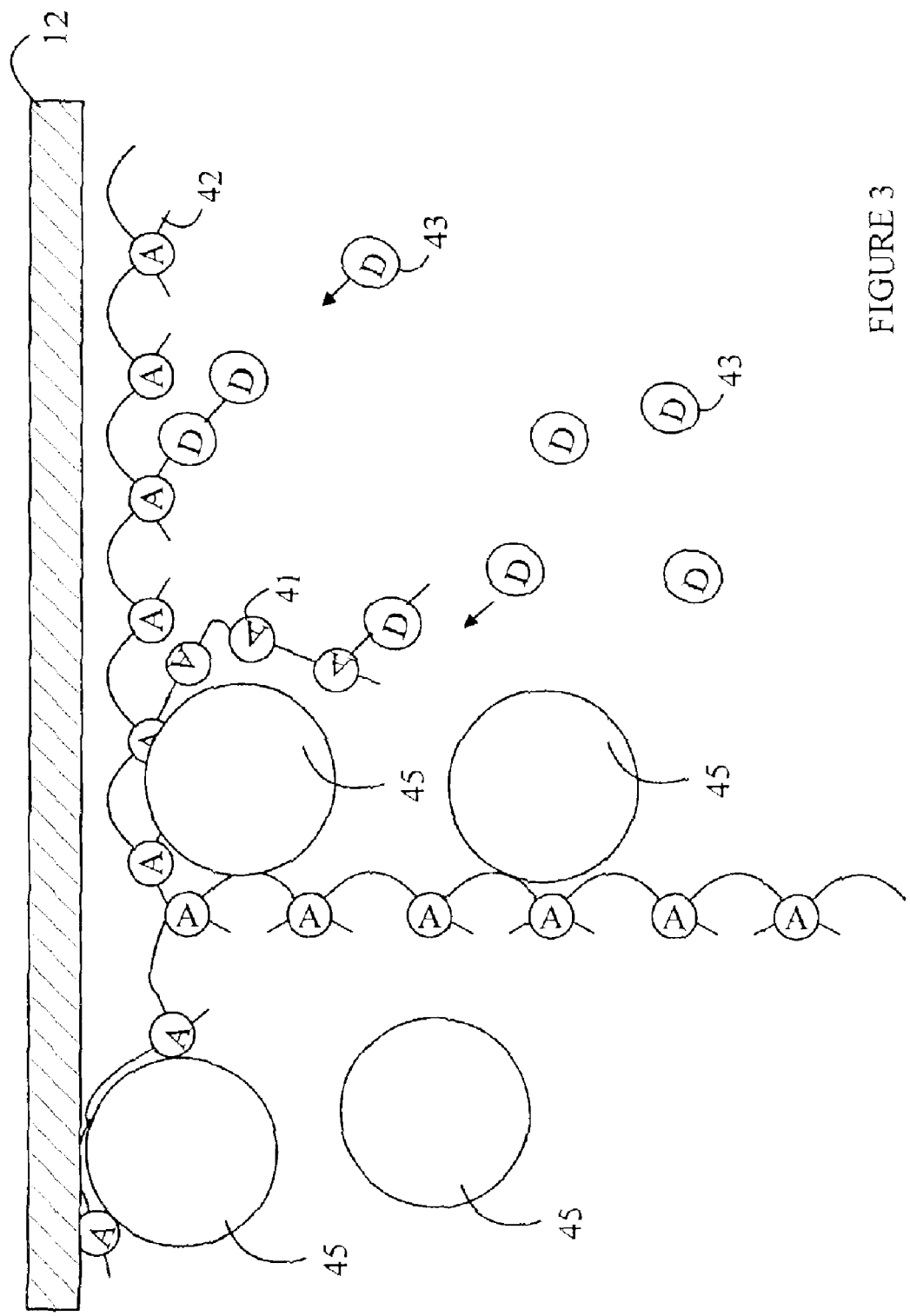
FIG. 3 illustrates the preparation of one class of electrochemically polymerizable polymers that are suitable for the present invention.

The manner in which the present invention provides its advantages can be more easily understood in terms of a simple example in which a relatively thick film of a compound having some desired optical property is to be patterned on a surface. For the purposes of this example, it will be assumed that the film is to have a particular dye to provide optical absorption or fluorescence in some predetermined band. A film constructed from particles having the desired optical property has a number of advantages. First, the deposition of such a film does not depend on building a thick layer from one or more layers of molecules, and hence, the deposition time can be substantially reduced relative to the deposition techniques involving vapor deposition.

Second, particles in a wide variety of sizes and materials are commercially available. For example, polystyrene particles that can be doped with dyes are well known to the art. Particles having diameters in 0.01 to 100 $\mu$m range are commercially available. The dye may be chemically incorporated in the particles or absorbed onto the surface of the particles. Similarly, particles of uniform size made from glasses, oxides, and metals are also commercially available. Methods for attaching various chemical groups to glass are well known in the chemical arts.

In principle, thick films of such particles can be obtained by suspending the particles in a gel and patterning a gel layer. However, to obtain a film with feature sizes in the micron size range, masking techniques must be utilized. If several such depositions are required, the previously deposited features will be subjected to the masking compounds, solvents, and annealing temperatures inherent in the masking procedure. Accordingly, construction of a film by such techniques is often infeasible.

The present invention is based on the observation that such particles can be incorporated into a film by entrapping the particles in a matrix of polymer molecules. In the present invention, the particles are modified to provide a surface that ionically binds or absorbs the molecules that are to be linked via electrochemical deposition to form the matrix. A suspension of the particles and linking molecules in an appropriate solvent is then brought into contact with an electrode on which the film is to be formed. The electrode is cycled to induce the electrochemical polymerization of the linking molecules. As the molecules are linked together to form long polymers, the particles become entrapped in the resulting matrix leaving a thick film consisting of the entrapped particles and polymer matrix.

The linking molecules can be relatively small monomer units that will polymerize into a long chain or multi-dimensional structure, or the linking molecules can be preformed polymers that are cross-linked by the electrochemical polymerization. Since the particles are insoluble in the solvent, the resulting matrix will also be insoluble and will be deposited on the electrode provided the surface charge on the particles is opposite to that on the electrode. Since the preferred electrochemical deposition reactions are oxidation reactions, particles having a negative surface charge are preferred. The surface of glass beads and polystyrene particles can be rendered negatively charged by attaching carboxyl groups to the surface.

An embodiment of the invention in which long polymer molecules are used as the linking monomers is illustrated in FIGS. 1 and 2. The optical functionality is provided in the microscopic particles 15. As noted above, the particles may be beads made from glass, metal oxides such as titanium oxide, cross-linked latex spheres or other material that does not dissolve in the solvent 17. The particles are doped to provide the desired optical functionality. For example, the particles can be doped with a dye to give the resulting film a desired optical property such as flourescence or absorption in a particular band. Titanium dioxide particles can be utilized to provide photovoltaic properties to the resulting film. These particles are chosen to have surface properties that allow the particles to ionically bind or absorb electrochemically polymerizable linkage molecules 14. If an organic solvent is used, poly(3,4-dioxyethylenethiophene) (PEDOT) can be electrochemically polymerized to provide a conducting film on an electrode that will entrap the particles.

In an aqueous solution having a pH adjusted to 2.5, 3,4-dioxyethylenethiophene (EDOT) can be used as the linking molecule. For example, a layer utilizing carboxylated polystrene spheres can be deposited by the electropolymerization of 0.03 g of EDOT with 1 ml of polystyrene sphere solution (1% solids) in 15 ml of water.

Electrochemical polymerization is preferably carried out in the mixture of particles and linkage molecules with three electrodes: working electrode 12, counter electrode 18 and reference electrode 19. A cyclic voltammetry or a bulk electrolysis process is then carried out with the aid of a conventional controller 20. The electrochemical polymerizable polymers are joined as shown at 16 during the electrochemical polymerization forming an insoluble composite film 21 in which the solid particles 15 are immobilized and dispersed in a conjugated polymer matrix. The thickness of the film can be precisely controlled by changing the condition of electrochemical deposition such as high potential, scan rate, number of cycles, type of conjugated monomer, etc.

Refer now to FIG. 3, which illustrates an embodiment of the present invention in which a seed polymer is used in conjunction with a smaller monomer to form a film by entrapping particles. FIG. 3 shows a portion of electrode 12 on which a film is created by entrapping particles 45 in a matrix formed by electrochemical polymerization of linkage polymers during the formation of the matrix. For the purposes of this example, it will be assumed that the linkage polymers are constructed from sub-units "A". A typical such sub-unit is shown at 41. It will be assumed that these sub-units have electrochemically polymerizable sites 42 that can be used to cross-link the linkage polymers. It will also be assumed that these sites, or other sites on the sub-units, can also be used to link the sub-units D shown at 43 via electrochemical polymerization. The D sub-units may be the same as A or the sub-units can be entirely different chemicals. During the electrochemical polymerization, the D sub-units are added to the linkage polymers thereby extending the linkage polymers and providing additional matrix material to further entrap particles 45.

It should be noted that a film according to the present invention is deposited on the electrode in a pattern that is determined by the shape of the electrode. Accordingly, the film can be patterned by patterning the electrode prior to the deposition of the film. Since techniques for patterning electrodes are well known in the semiconductor fabricating arts, these techniques will not be discussed in detail here. However, it should be noted that if a plurality of films of different compositions are to be deposited, no additional masking steps are needed once the various electrodes defining the films have been deposited and patterned. A film will only be deposited on an active electrode. Hence, the film corresponding to a first electrode can be deposited in the presence of a film that has already been deposited on a second electrode without masking the film over the second electrode. As long as the second electrode is not powered during the deposition of the film over the first electrode, no additional film will be deposited over the second electrode.

The present invention can be practiced with a wide range of particles in addition to those discussed above. For example, particles of semiconductors such as cadmium selenide and gallium arsenide can be utilized. In addition, particles based on aluminum oxide, gold, and silver nanoparticles can also be utilized. Techniques for modifying these particles are known to the art, and hence, particles based on these various known modifications can also be utilized.

Various modifications to the present invention will become apparent to those skilled in the art from the foregoing description and accompanying drawings. Accordingly, the present invention is to be limited solely by the scope of the following claims.

What is claimed is:

1. A film comprising:
    a plurality of particles having a desired film property; and
    a matrix of linkage polymer molecules, said linkage polymer molecules binding to said particles and said linkage polymer molecules being electrochemically polymerizable and soluble in an electrically conducting solvent in which said particles are insoluble.
2. The film of claim 1 wherein said linkage polymer molecules are ionically bound to said particles.
3. The film of claim 1 wherein said linkage polymer molecules are absorbed onto the surface of said particles.
4. A film comprising:
    a plurality of particles having a desired film property;
    a matrix of linkage polymer molecules, said linkage polymer molecules binding to said particles and said linkage polymer molecules being electrochemically polymerizable and soluble in an electrically conducting solvent in which said particles are insoluble; and wherein said particles comprise latex particles.

5. A film comprising:

a plurality of particles having a desired film property;

a matrix of linkage polymer molecules, said linkage polymer molecules binding to said particles and said linkage polymer molecules being eleotrochemically polymerizable and soluble in an electrically conducting solvent in which said particles are insoluble; and wherein said particles comprise polystyrene particles.

6. A film comprising:

a plurality of particles having a desired film property;

a matrix of linkage polymer molecules, said linkage polymer molecules binding to said particles and said linkage polymer molecules being electrochemically polymerizable and soluble in an electrically conducting solvent in which said particles are insoluble; and wherein said particles comprise titanium oxide.

7. A film comprising:

a plurality of particles having a desired film property;

a matrix of linkage polymer molecules, said linkage polymer molecules binding to said particles and said linkage polymer molecules being electrochemically polymerizable and soluble in an electrically conducting solvent in which said particles are insoluble; and wherein said particles comprise silicon dioxide.

8. A film comprising:

a plurality of particles having a desired film property;

a matrix of linkage polymer molecules, said linkage polymer molecules binding to said particles and said linkage polymer molecules being electrochemically polymerizable and soluble in an electrically conducting solvent in which said particles are insoluble;

wherein said particles comprise polystyrene particles; and wherein said particles have diameters between 0.01 $\mu$m and 100 $\mu$m.

9. A film comprising:

a plurality of particles having a desired film property;

a matrix of linkage polymer molecules, said linkage polymer molecules binding to said particles and said linkage polymer molecules being electrochemically polymerizable and soluble in an electrically conducting solvent in which said particles are insoluble; and wherein said particles comprise a dye for imparting a desired optical property to said film.

10. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent; and providing an electrical potential between said solution and said electrode in temporal sequence that causes said linkage polymer molecules to polymerize in the vicinity of said electrode.

11. The method of claim 10 wherein said linkage polymer molecules are ionically bound to said particles.

12. The method of claim 10 wherein said linkage polymer molecules are absorbed onto the surface of said particles.

13. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode; and wherein said particles comprise latex particles.

14. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode; and wherein said particles comprise polystyrene particles.

15. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode; and wherein said particles comprise titanium oxide.

16. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode; and wherein said particles comprise silicon dioxide.

17. A method for preparing a film having a desired film property comprising:

providing an electrode;

providing a solution of linkage polymer molecules an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode;

wherein said particles comprise polystyrene particles; and wherein said particles have diameters between 0.01 $\mu$m and 100 $\mu$m.

18. A method for preparing a film having a desired film property comprising:

providing an electrode;

providing a solution of linkage polymer molecules in an electrically conducting solvent, said solution including a plurality of particles that are insoluble in said solvent, said linkage polymer molecules binding to said particles and said linkage polymer molecules being soluble and electrochemically polymerizable in said solvent;

providing an electrical potential between said solution and said electrode in temporal sequence that causes said linkage polymer molecules to polymerize in the vicinity of said electrode; and wherein said particles comprise a dye for imparting a desired optical property to said film.

* * * * *